Oct. 13, 1970 R. D. COLE ETAL 3,533,551
BOMB BALLISTIC SLIDE RULE
Filed Nov. 20, 1968 9 Sheets-Sheet 1

INVENTORS.
ROY D. COLE
ALEXANDER K. ROGERS
BY ROY MILLER
ATTORNEY.

COORDINATE SYSTEM FOR DIVE ATTACK. STICK RELEASE. A STRAIGHT FLIGHT PATH IS ASSUMED BETWEEN THE FIRST AND LAST BOMB.

COORDINATE SYSTEM FOR DIVE ATTACK. SINGLE OR SALVO RELEASE.

United States Patent Office 3,533,551
Patented Oct. 13, 1970

1

3,533,551
BOMB BALLISTIC SLIDE RULE
Roy D. Cole and Alexander K. Rogers, China Lake, Calif., assignors to the United States of America as represented by the Secretary of the Navy
Filed Nov. 20, 1968, Ser. No. 777,423
Int. Cl. G06c 3/00
U.S. Cl. 235—89        5 Claims

ABSTRACT OF THE DISCLOSURE

A bomb ballistic slide rule which presents in a compact and accessible form all the data that an attack pilot needs to compute various quantities needed for single, salvo, or stick bombing and simultaneously provides a simple means of making the computations.

GOVERNMENT INTEREST

The invention described herein may be manufactured and used by or for the Government of the United States of America for governmental purposes without the payment of any royalties thereon or therefor.

BACKGROUND OF THE INVENTION

Heretofore, computing for lead angle involved in making single, salvo, or stick bombing runs, involved the steps of: (1) computing the ballistic lead angle from ballistic tables for the bomb being used; (2) applying a correction for the nonzero ejection velocity of the bomb and (3) computing the angle of attack of the particular aircraft involved from a nomograph in the aircraft flight manual. The three angles were then added to yield total lead angle.

In actual practice, bomb tables are so troublesome to use that many squadrons simply use a standard attack, and make a rule-of-thumb correction to the lead angle if some other attack is used. This however, generally leads to decreased accuracy.

Attempts have been made to provide attack pilots with hand held computers for computing various functions needed in releasing the ordnance. One of these is exemplified in U.S. Pat. 3,184,161 entitled, "Low Altitude Bombing Hand Computer," by P. H. Ward et al.

SUMMARY OF THE INVENTION

The bomb ballistic computer comprises a slide rule having a fixed outer portion with front and back sides and a slider portion having a front and back side which cooperates with the front and back sides of the fixed body portion. Various indicia are placed on the front and back sides of the fixed portion and the front and back sides of the slider portion which cooperate therebetween to provide the desired information needed by the attack pilot.

2

Figure 9:
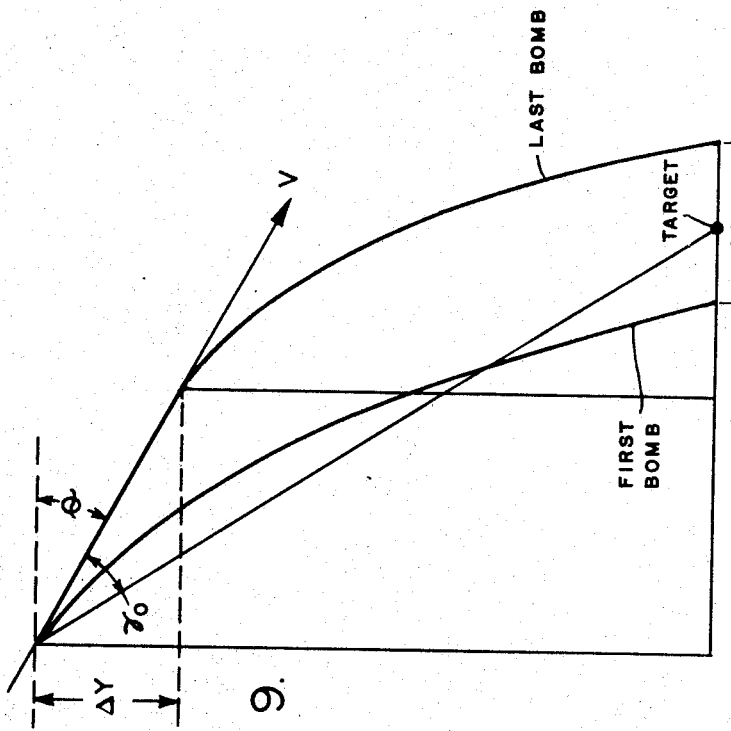
Figure 10:
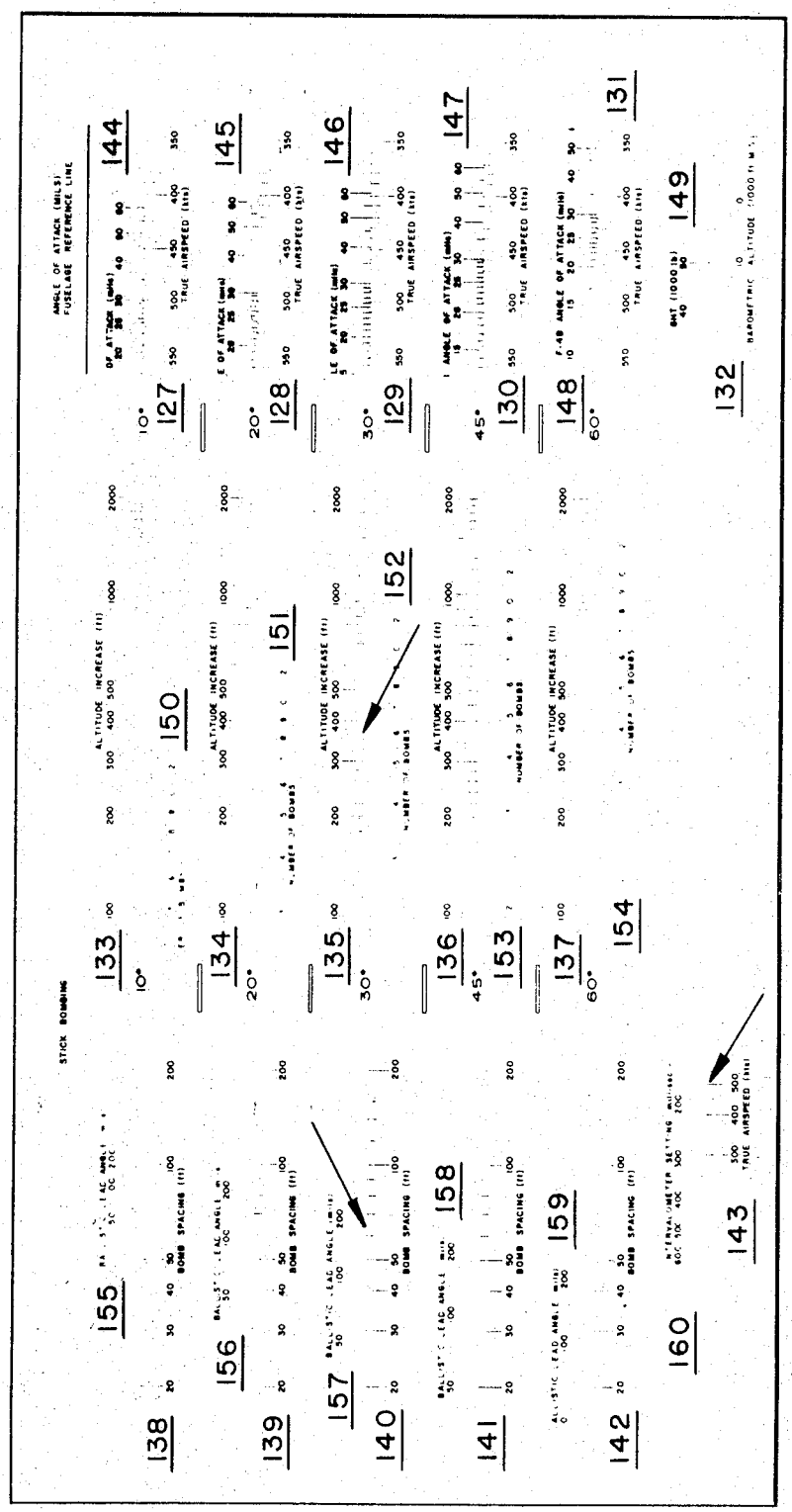

FIG. 9 illustrates the coordinate system for dive attack stick release; and
FIG. 10 illustrates a slide rule setting for stick bombing.

PREFERRED EMBODIMENT OF THE INVENTION

The bomb ballistic slide rule is made of plastic and the outside portion of the rule has see through windows for reading the indicia on the slider. However, it is to be understood that the slide rule could be made of metal or special paper and cutouts could be used in the outside portion of the rule for reading the indicia on the slider. It is also to be understood that the scales on the slider and body portion of the rule can be designed to give the needed information for any type aircraft. In fact, all that needs to be changed is the angle of attack information which will be explained subsequently.

The ballistic scales might also be designed for any bomb, retarded or nonretarded. In addition, a ballistic scale instead of being given as a function of altitude, could equally well be given in terms of slant range or ground range, if desired. Furthermore, different ranges of altitude, dive angle, and velocity could be employed. However, the scales on the slide rule as illustrated include most cases of operational interest. In addition, the scales could be arranged in a different fashion on the body and slider portion however, the exact relative positions of the groups of scales are fixed.

Figure 1:
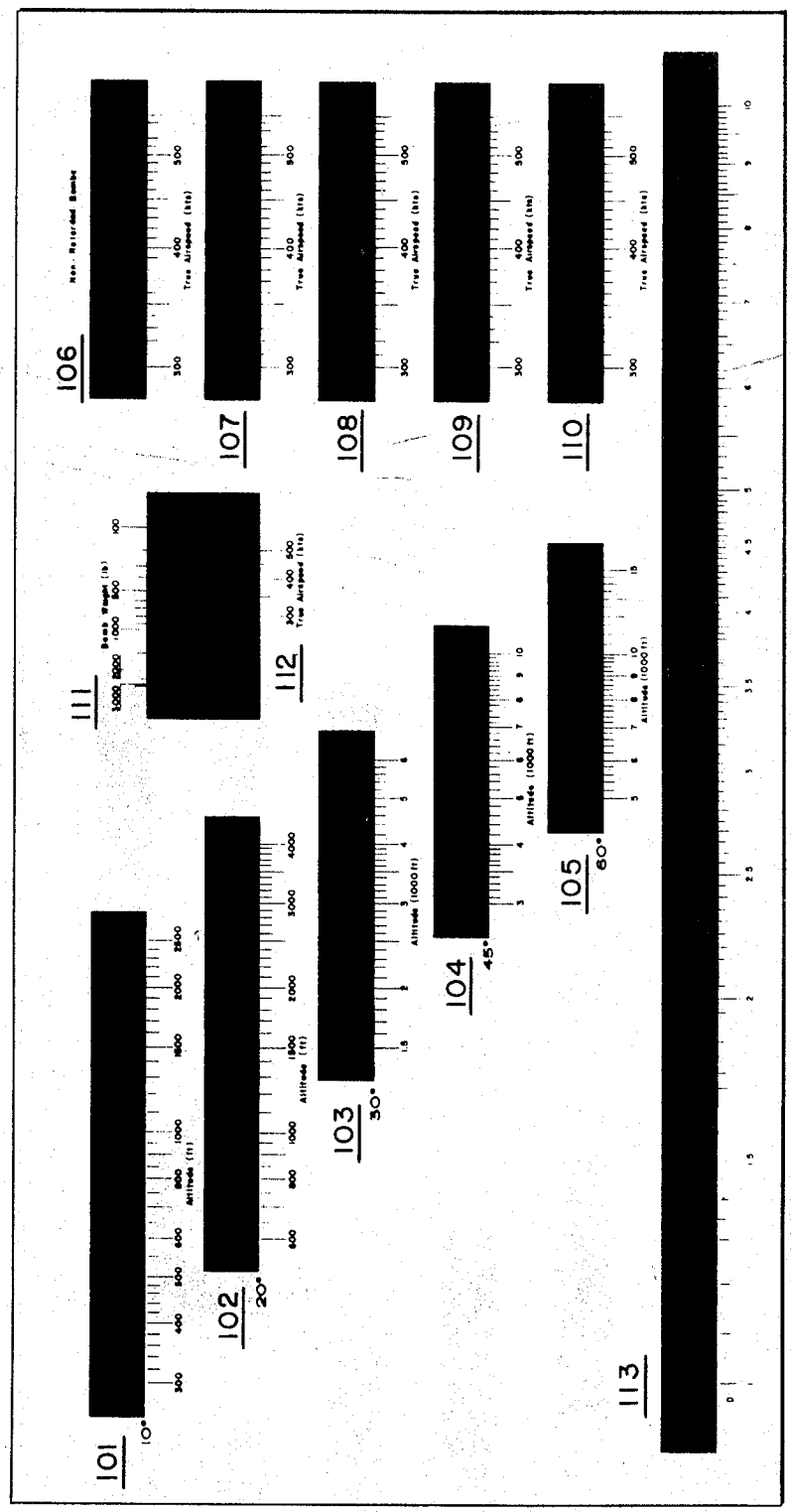
FIG. 1 illustrates the indicia appearing on the front outside of the fixed body portion.

FIG. 1 illustrates the front outside of the fixed portion of the rule wherein scales 101–105 are the dive angles and respective altitudes. Scale 111 is the bomb weight in pounds, scale 112 is the true air speed in knots, scales 106–110 are true air speed in knots for nonretarded bombs and scale 113 is a logarithmic D scale.

Figure 2:
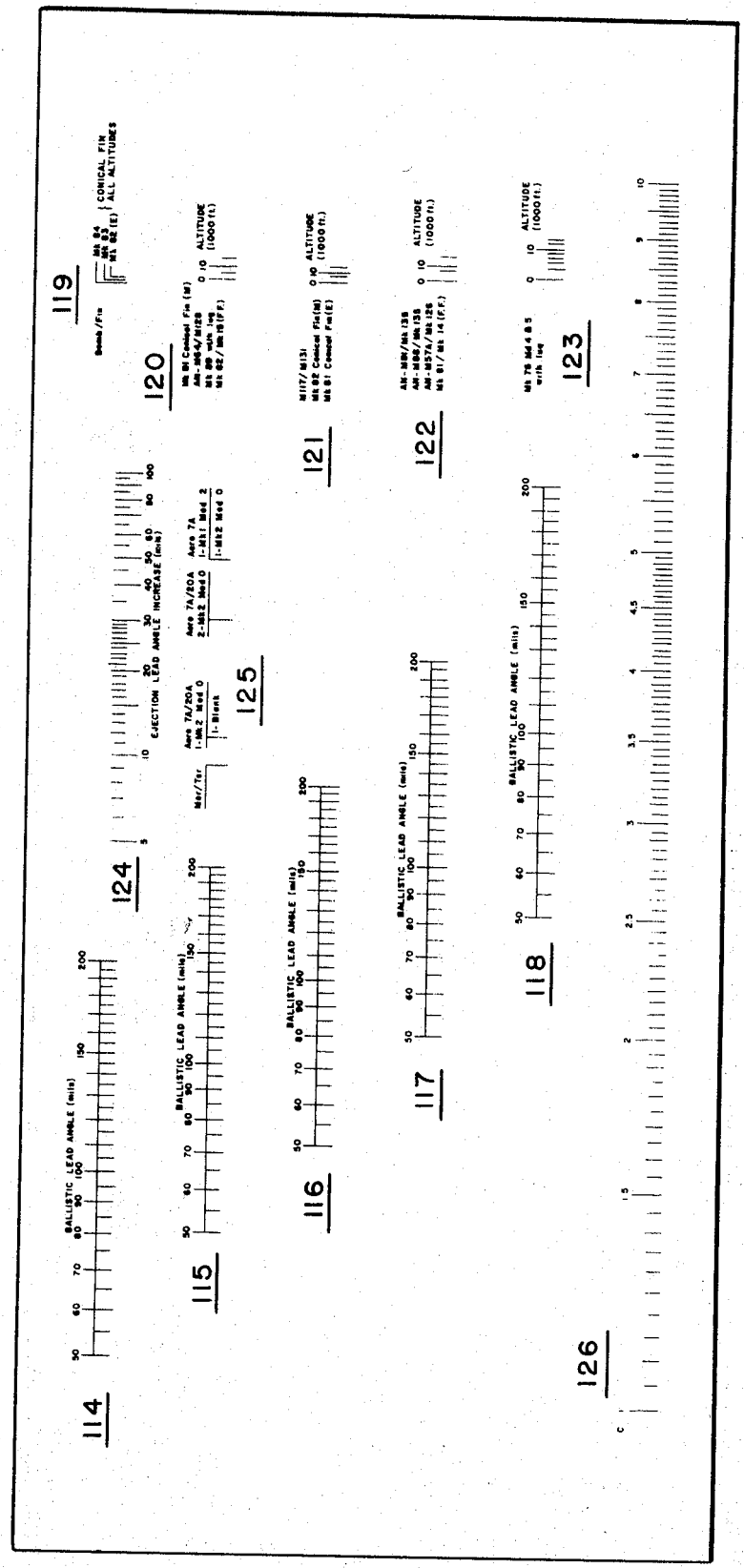
FIG. 2 illustrates the indicia on the front of the slider.

FIG. 2 is the front of the slider portion of the slide rule and has indicia 114–118 corresponding to the ballistic lead angle in mils; scales 119–123 corresponding to bomb type for particular altitude; indicia 124 corresponding to the ejection lead angle increase in mils; scale 125 which has indicia corresponding to the particular bomb rack and ejection cartridge being used and scale 126 which is a logarithmic C scale.

Figure 3:
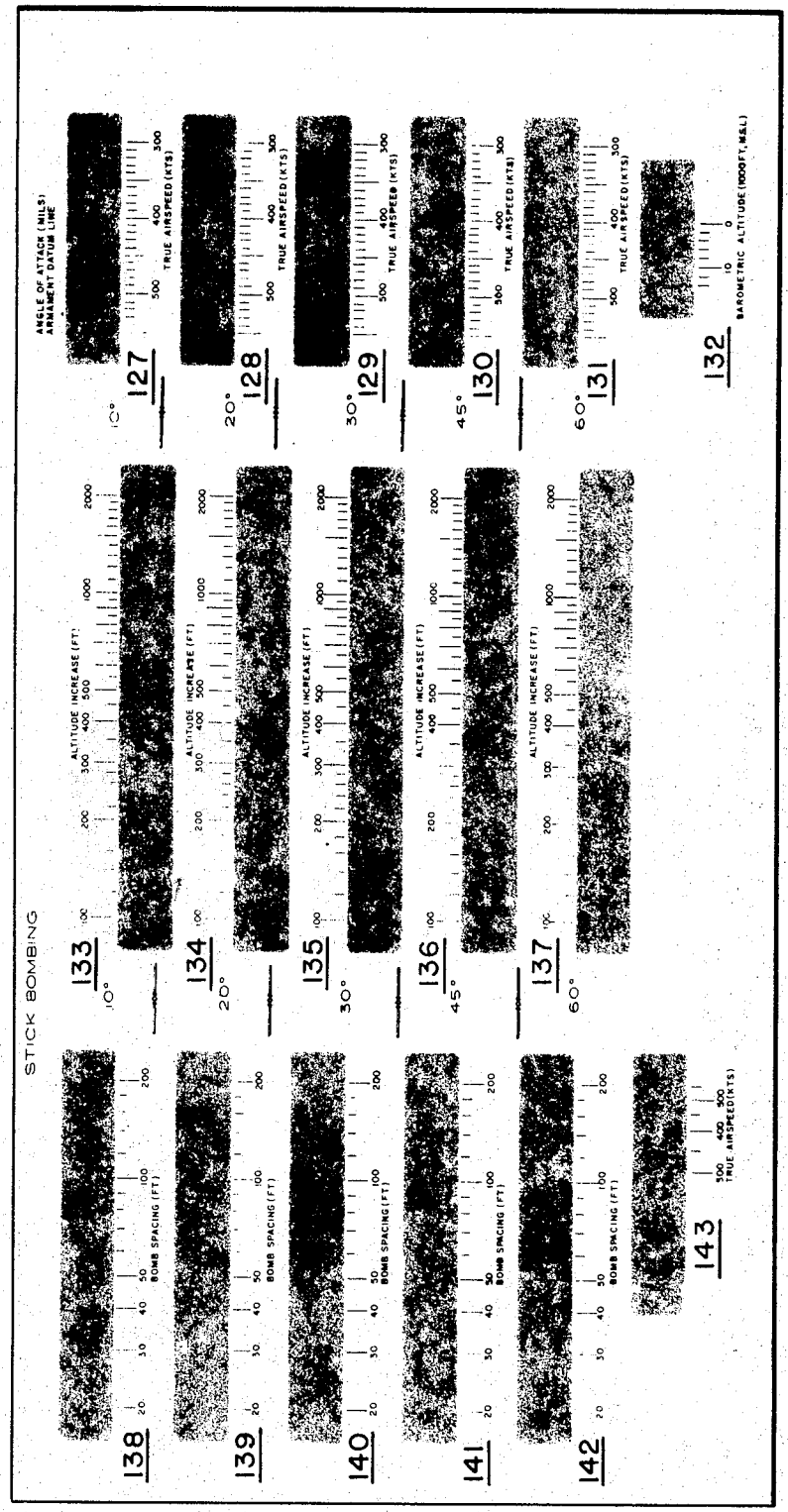
FIG. 3 illustrates the indicia appearing on the back outside of the body portion.

FIG. 3 illustrates the back of the outside portion of the rule and has indicia 127–131 which corresponds to a particular dive angle versus true air speed in knots; scales 133–137 for a particular dive angle versus altitude increase in feet; indicia 138–142 which correspond to the bomb spacing in feet and scale 143 which corresponds to true air speed in knots.

Figure 4:
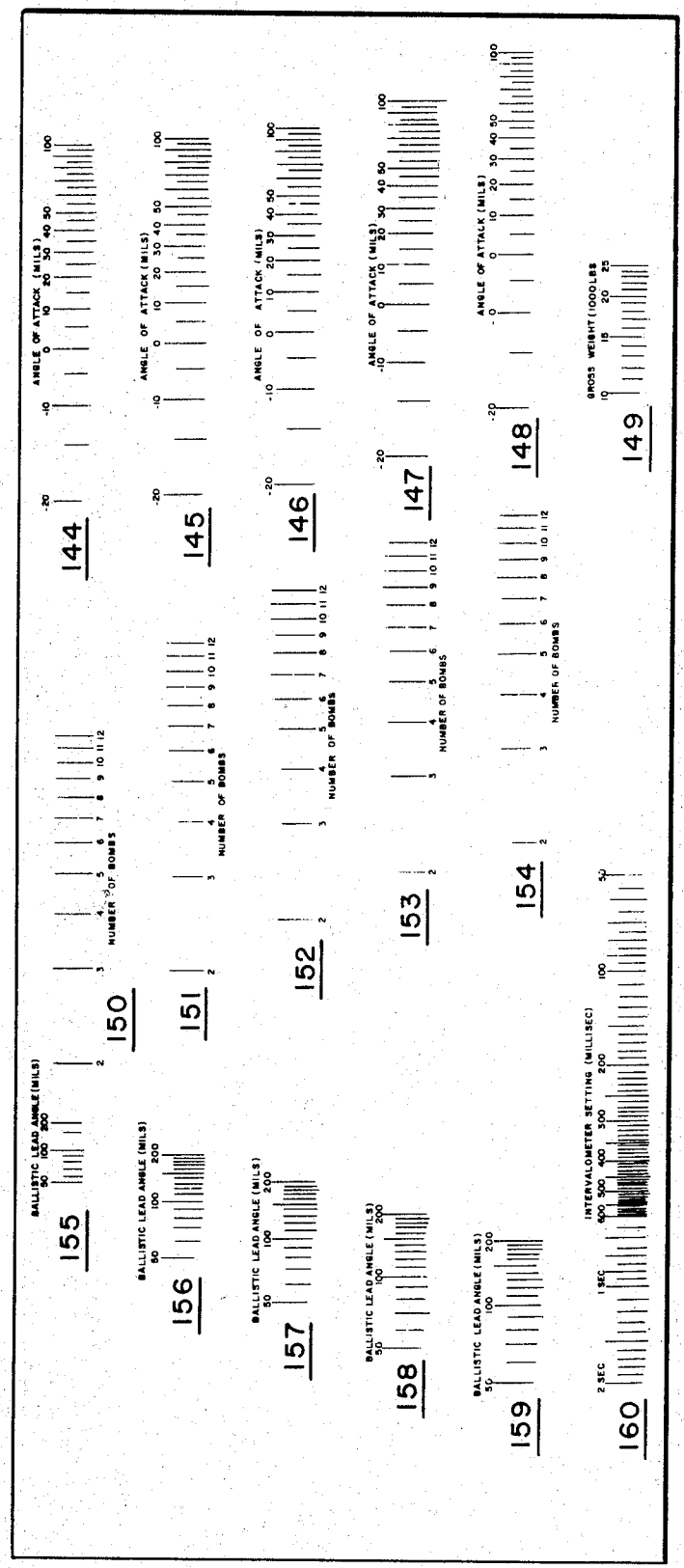
FIG. 4 illustrates the indicia appearing on the back of the slider.

FIG. 4 is the back portion of the slider of the ballistic slide rule and has thereon indicia 144–148 corresponding to the angle of attack in mils with respect to the fuselage reference line; scale 149 which corresponds to the gross weight of the aircraft in increments of 1,000 pounds; indicia 150–154 which correspond to the number of bombs in the stick; indicia 155–159 which correspond to a ballistic lead angle in mils and scale 160 which is the intervalometer setting in milliseconds.

Various examples will now be given to illustrate the function and use of the ballistic slide rule. As stated previously, the rule is set up for the nonretarded bombs. The ballistic slide rule may be used to solve the following quantities; (1) ballistic lead angle as a function of altitude, true air speed and dive angle; (2) lead angle increase due to nonzero ejection velocity, as a function of bomb weight, true air speed and rack type; (3) angle of attack of the fuselage reference line of a particular aircraft as a function of gross weight, altitude, true air speed, and dive angle and (4) for altitude to release the first bomb of a stick and the setting for the intervelometer, as a function of ballistic lead angle of the last bomb, altitude at release of the last bomb, true air speed, desired bomb spacing and number of bombs. Each of the above solutions requires only one setting of the slide.

Figure 5:
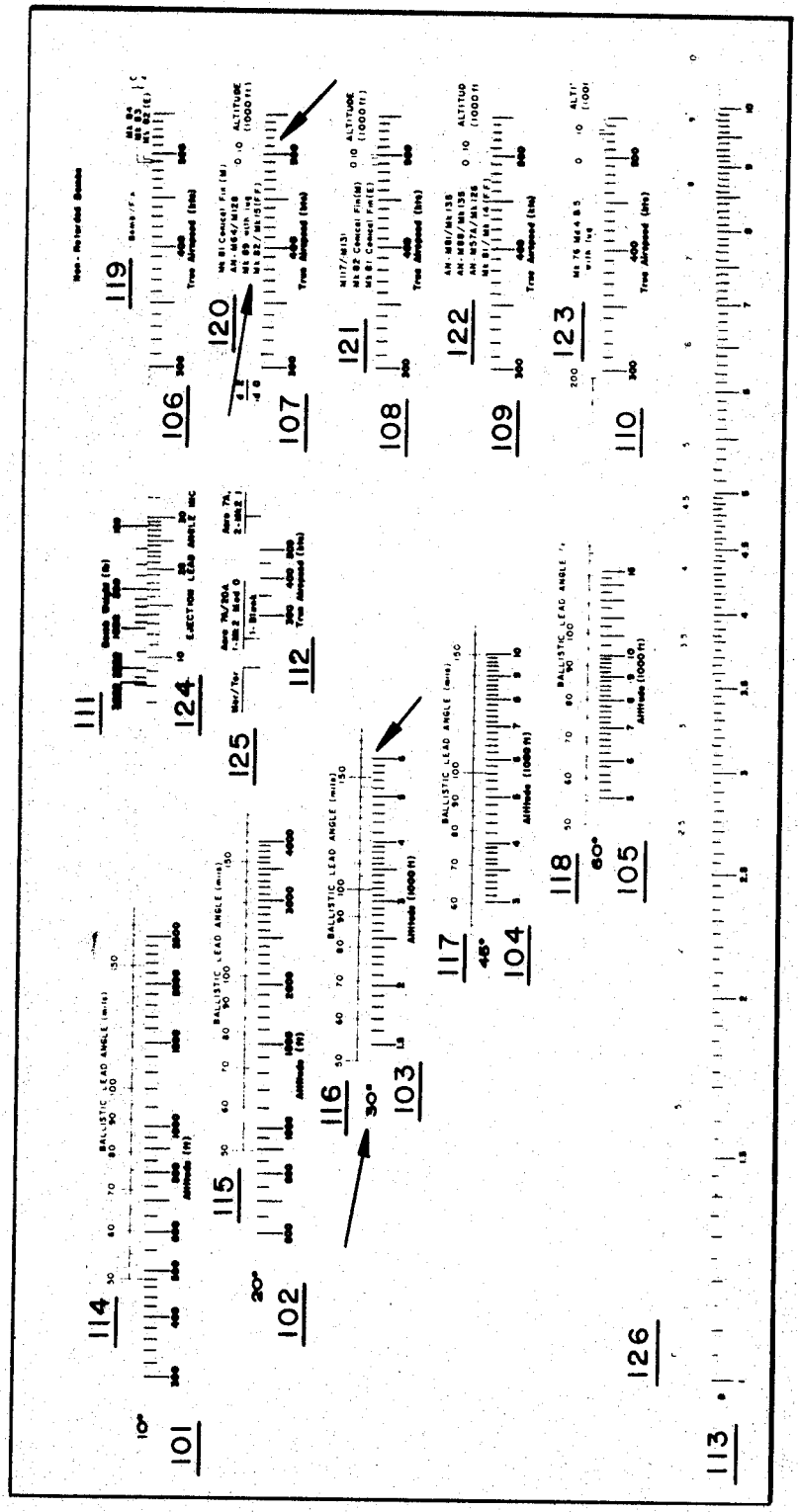
FIG. 5 illustrates a setting for ballistic lead angle.

In order to compute ballistic lead angles ($\gamma$), reference is made to FIG. 5 wherein one would find which of the scales 119–123 correspond to the desired bomb type. Next on this scale, set the release altitude above the target over true air speed on the corresponding scale 106–110. Next, at the left of the slide rule, find a window which corresponds to the chosen dive "release" angle, in this instance, scale 103 for a 30° dive angle. One may then read the ballistic lead angle on scale 116 directly above the altitude in the chosen dive angle window. In this example, read the bomb type on scale 120 corresponding to a Mk 82/Mk 15 (freefall) at a release altitude of 6,000 feet with a true air speed of 500 knots which will give a ballistic lead angle of 161 mils on scale 116 over the 6,000 foot altitude on scale 103. It is to be noted that scales 101–105 and 114–118 are arranged according to the dive angle. On the other hand, scales 119–123 and 106–110 are not arranged by dive angles but rather are arranged according to bomb type.

Figure 6:
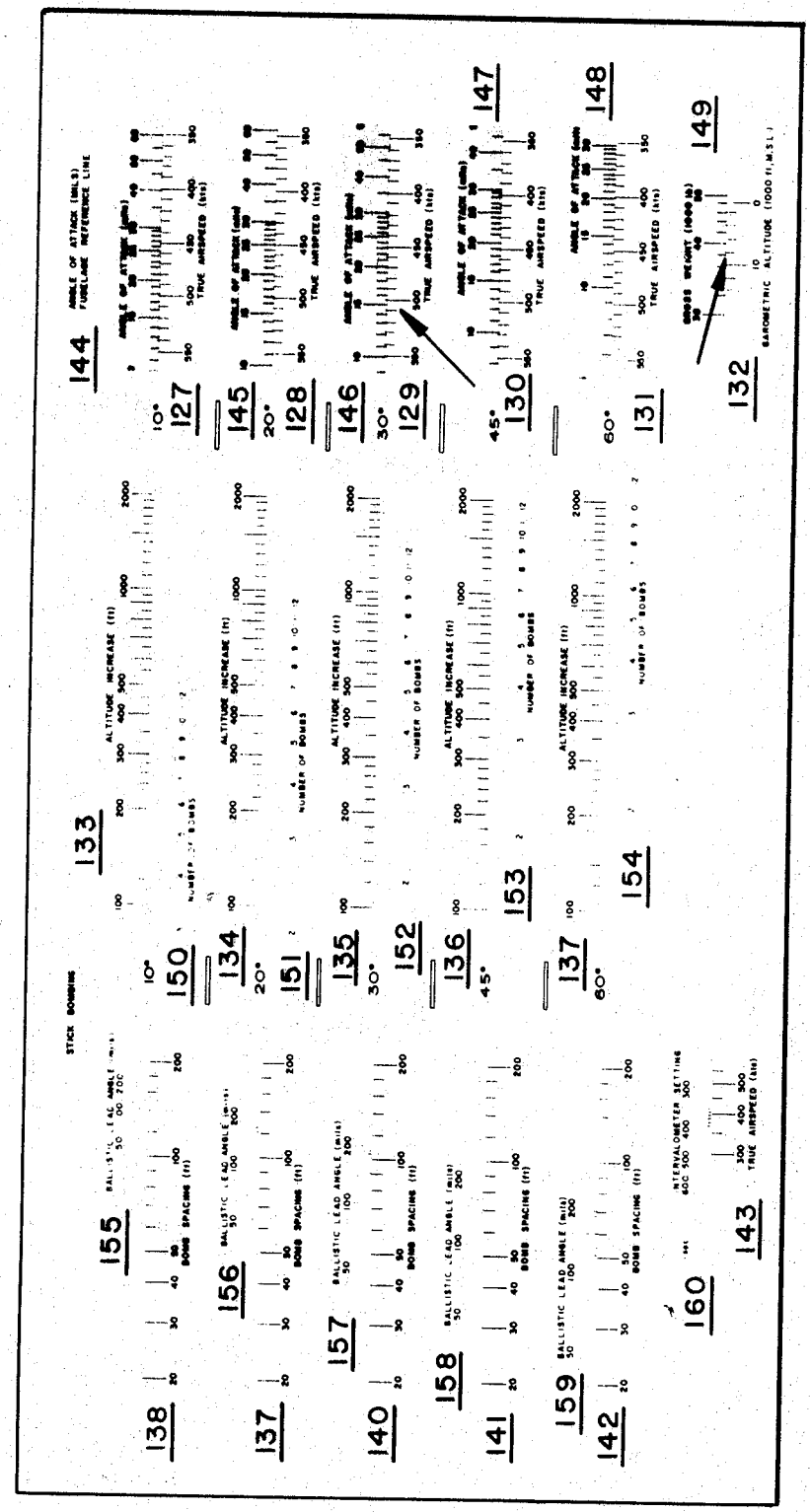
FIG. 6 illustrates a setting for angle of attack.

Next, angle of attack ($\alpha$FRL) is to be computed. With reference to FIG. 6, first set the aircraft gross weight on scale 149 over the release altitude above sea level on scale 132. Then read the angle of attack on scales 144–148 above the corresponding true air speed scales 127–131 in the chosen dive angle window. In this instance, assume an aircraft with a gross weight of 40,000 pounds, altitude of 7,000 feet, true air speed of 500 knots and dive angle of 30°. Angle of attack would be 15½ mils on scale 146.

Figure 7:
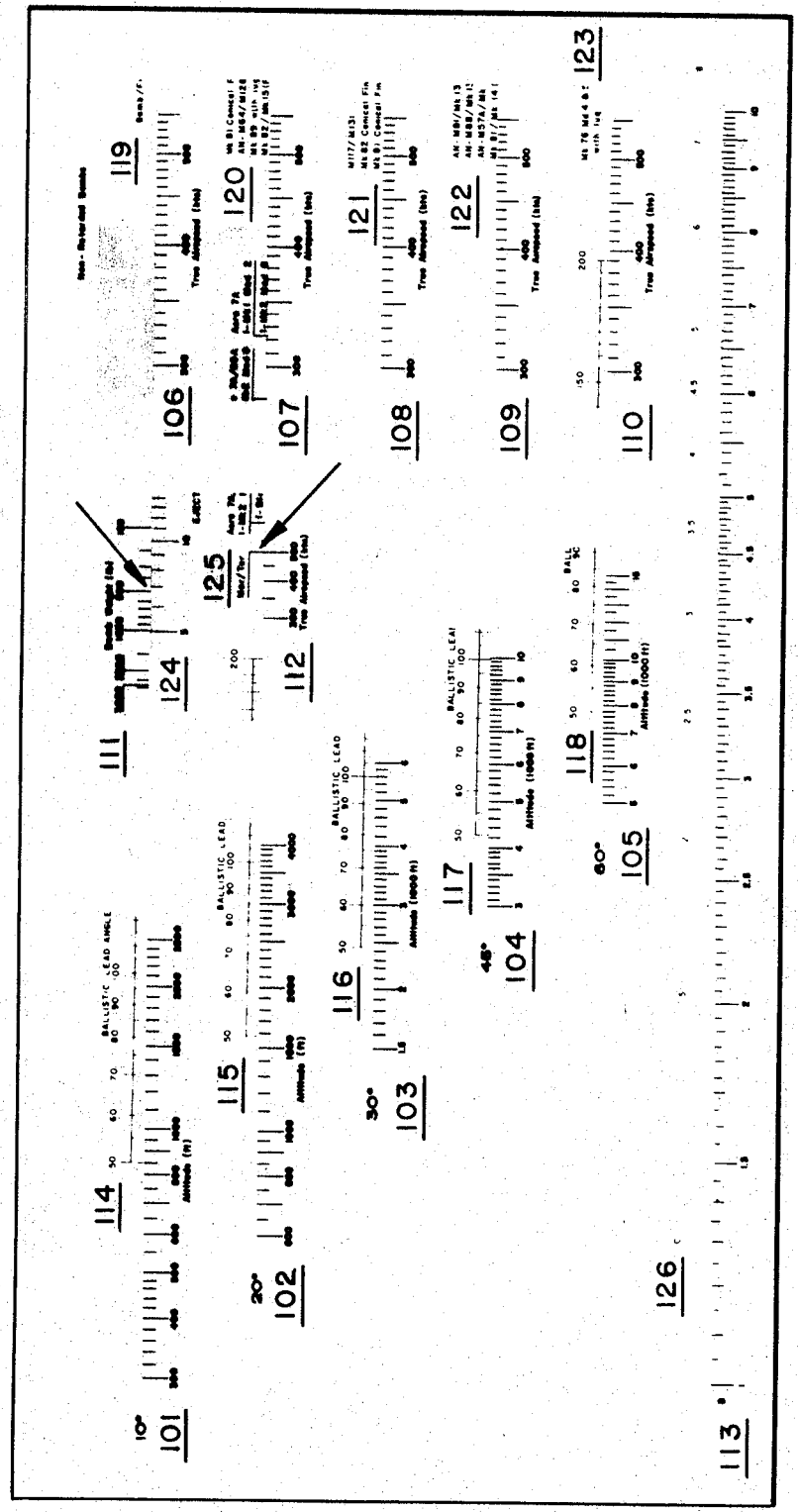
FIG. 7 illustrates a setting for ejection lead angle increase.

Next, assume that an ejection lead angle increase ($\epsilon_e$) is to be computed. This is the computation for lead angle increase due to the ejection of the bomb and reference is made to FIG. 7. First, set the rack and cartridge used on scale 125 over the true air speed on scale 112. Then read, in the same window the angle change on scale 124 for the given bomb weight on scale 111. In this example, set on scale 125 a Mu/Ter rack over a true air speed of 500 knots on scale 112 and read out under 500 on scale 111 a lead angle increase of about 6.75 mils on scale 124.

To compute the total lead angle one merely adds the angle of attack plus the ejection lead angle increase plus the ballistic lead angle to arrive at the formula $$\lambda = \alpha\text{FRL} + \gamma + \epsilon_e$$

In order to be strictly accurate the following procedures should be used in computing lead angles. (a) Select a nominal dive angle $\theta = 10°, 20°, 30°, 45°,$ or $60°$. (b) Compute the quantities as above indicated. (c) Add the angle of attack, $\alpha$, an ejection lead angle increase, $\epsilon_e$ and multiply by 0.06 to convert mils into degrees. The actual pitch angle which the pilot should fly is $\theta - (\alpha - \epsilon_e)$. The total lead angle $\gamma$ computed in step (c) is unchanged. For example, suppose $\epsilon_e = 25$ mils, $\alpha = 5$ mils and $\theta = 10°$. Then, $-\epsilon_e = 30$ mils $= 1.8°$ or the actual pitch angle should be $10° - 1.8° = 8.2°$. Generally, this correction is significant only for shallow dive angles ($\theta = 10°$ or $20°$). For steeper dives the correction is normally neglected.

Scale 113 and 126 are normally used to perform standard multiplication and division just as an ordinary logarithmic slide rule.

Figure 8:
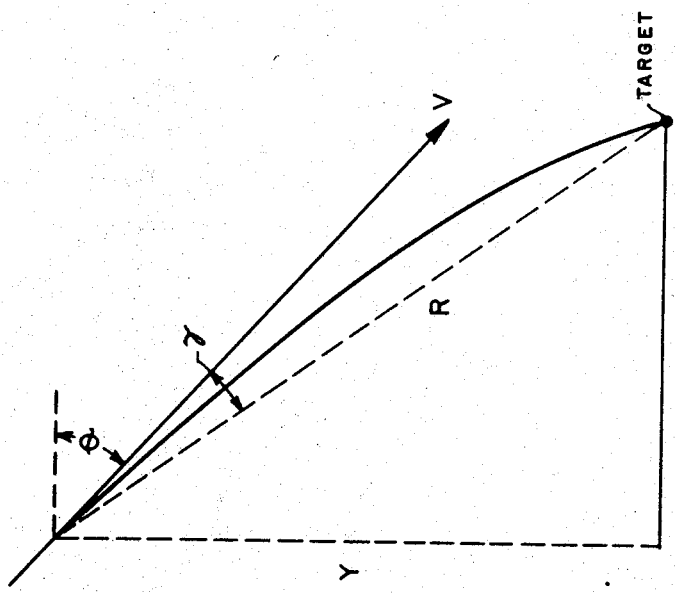
FIG. 8 illustrates the coordinate system for dive attack single or salvo release.

FIG. 8 will be referred to in computing ballistic lead angles for the first bomb ($\gamma_0$). In the figure a single bomb release is illustrated in which the bomb is aimed to hit the target. Now suppose the last bomb of the stick in FIG. 9 is released at the same altitude, air speed, dive angle as a single bomb in FIG. 8. It results that the ballistic lead angle, $\gamma_0$, for the first bomb in FIG. 9 which will center the stick around the target is, for all practical purposes, equal to the ballistic lead angle $\gamma$ for the single release attack in FIG. 8 (assuming a straight flight path between the release of the first and last bomb). Thus, $\gamma_0$ is about equal to $\gamma$.

If a more accurate balistic lead angle for first bomb release is desired, a first-order correction may be obtained from the formula $$\gamma_0 \doteq \gamma = \frac{\text{total stick length in feet}}{K}$$

where $\gamma$ is computed on the front of the slide rule using dive angle, air speed, and altitude for the last bomb of the stick as though for a single release, $\gamma_0$ is the ballistic lead angle to the target at the release point of the first bomb of the stick, and K is a constant given by the table below. This equation is only true for low-drage bombs.

| True airspeed (kts.): | K (feet/mil) |
|---|---|
| 300 | 50 |
| 400 | 100 |
| 500 | 200 |

(Both $\gamma$ and $\gamma_0$ are in mils).

For example, consider the case:

Mk 81/Mk 14 freefall (Snakeye I)
First bomb release altitude = 3,000 ft.
Last bomb release altitude = 2,500 ft.
True air speed = 450 kts.
Dive angle = 30°

These conditions yield a stick length of 300 feet and a slant range to the target from the release point of the first bomb of 5,170 feet, assuming the stick to be centered about the target. Under these same conditions, a single bomb release to hit the target from 2,500 feet requires a ballistic lead angle of $\gamma = 97.5$ mils (from bomb tables). The stick release ballistic lead angle (at 3,000 feet) from the first bomb release point to the target center is $\gamma_0 = 95.8$ mils (from the same table). Thus, the lead differs by 1.7 mils, so for practical purposes, $\gamma \doteq \gamma_0$, and a ballistic lead angle of 97.5 mils may be used for the first bomb of the stick (since bomb dispersion is 2 or 3 mils even on a well designed bomb). If the angle is corrected according to the table above (interpolating K = 150) the result is $\gamma_0 = 95.5$ mils, which is yet another improvement.

In order to compute the altitude increase for a stick release ($\Delta y$), the ballistic lead angle for the first bomb is computed on the basis of the release conditions for the last bomb. The first bomb is released at the same air speed and dive angle as the last bomb, but at a greater altitude. This altitude increase $\Delta y$ is computed as follows with respect to FIG. 10. Find the ballistic lead angle of the first bomb (computed above) on scales 155–159 in the window corresponding to the dive angle desired. Once a particular window is found, set the ballistic lead angle over the bomb spacing wanted on scales 138–142. In the window just to the lower right, read the increase in altitube on scales 133–137 above the number of bombs in the stick which appear on scales 150–154. Leave the scales set for the next computation for stick intervelometer setting $\Delta t$. This increase, added to the release altitude for the last bomb, gives the first bomb release altitude.

Also with respect to FIG. 10, the intervalometer setting $\Delta t$, which is the time between successive bombs, may be computed. The scales are still set as in computing the altitude increase for the stick release $\Delta y$. Then read the time on scale 160 above the true air speed on scale 143. The altitude increase for a stick release of six bombs is approximately 360 feet as read on scale 135 and the intervalometer setting in milliseconds is approximately 175 as read on scale 160.

One may compute the angle of attack for a stick release the same as for a single release but using the altitude of the first bomb release in computing.

The ejection lead angle increase, $\epsilon e$, for a stick release is the same as for a single release, as is the total lead angle $\gamma$. The note on computing lead angles applies to stick releases as well as single releases.

What is claimed is:

1. A bomb ballistic slide rule for solving ballistic lead angle as a function of altitude, true air speed and dive angle comprising:

a body portion with separated first and second sides;

a slider portion having a first and second side adapted to slide between said first and second sides of said body portion;

a first plurality of vertically arranged horizontally extending transparent windows disposed on said first side of said body portion, each of said transparent windows being horizontally offset with respect to each other, said offset being a function of said dive angle, each of said transparent windows having altitude graduations for the corresponding dive angle adjacent one edge thereof;

a second plurality of vertically arranged horizontally extending transparent windows disposed on said first side of said body portion each having a true airspeed scale disposed adjacent one edge thereof;

said slider portion having a first plurality of scales indicating the ballistic lead angle on said first side thereof, each being in cooperative registration with the respective altitude graduations adjacent said first plurality of transparent windows;

said slider portion including a second plurality of scales indicating the bomb type for a given altitude on said first side thereof, each being in cooperative registration with the respective air speed scales adjacent said second plurality of transparent windows;

whereby upon positioning of said slider such that a particular chosen dive angle will result in a read out of a ballistic lead angle on a transparent window over the same altitude reading on the slider as that used in conjunction with the release altitude over target for a bomb type with regard to true air speed on the body.

2. A bomb ballistic slide rule as set forth in claim 1 further including indicia for solving lead angle increase due to nonzero ejection velocity as a function of bomb weight, true airspeed and rack type comprising:

an additional transparent window on said first side of said body portion having a bomb-weight scale disposed adjacent the top edge thereof and a true airspeed scale disposed adjacent the lower edge thereof;

said slider portion further including an ejection lead angle increase scale and a bomb rack and ejection cartridge scale disposed on said first side thereof for cooperative registration with said bomb weight scale and said true airspeed scale, respectively, adjacent said additional transparent window;

whereby when the rack and cartridge used is aligned with the true airspeed a readout ejection lead angle increase results for a particular bomb weight.

3. A bomb ballistic slide rule as set forth in claim 1 and further including other indicia on the slide rule for computing angle of attack of the fuselage reference line of a particular aircraft as a function of gross weight, altitude, true air speed and dive angle comprising:

a first transparent window on said second side of said body portion having indicia corresponding to release altitude above sea level disposed adjacent one edge thereof;

a first scale corresponding to aircraft gross weight disposed on said second side of said slider portion in cooperative registration with said first transparent window;

a first plurality of vertically aligned horizontally extending transparent windows on said second side of said body portion, each having indicia corresponding to dive angle and true air speed information disposed adjacent one edge thereof; and a plurality of scales corresponding to angle of attack disposed on said second side of said slider portion in cooperative registration with said first plurality of transparent windows;

whereby the angle of attack may be read out over corresponding true air speed in a particular dive angle window when the aircraft gross weight is set over the release altitude above sea level.

4. A bomb ballistic slide rule as set forth in claim 1 and further including indicia thereon for solving for altitude to release the first bomb of a stick as a function of ballistic lead angle of the last bomb as computed in claim 1, altitude at release of last momb, true air speed, desired bomb spacing and number of bombs comprising;

a second plurality of vertically aligned horizontally extending transparent windows on said second side of said body portion, each having indicia corresponding to altitude increase disposed adjacent one edge thereof;

a third plurality of horizontally extending transparent windows on said second side of said body portion, each having indicia corresponding to bomb spacing disposed adjacent one edge thereof;

a plurality of scales indicating the number of bombs disposed on the second side of said slider portion in cooperative registration with said altiude increase scale adjacent said second plurality of windows; and a plurality of ballistic lead angle scales disposed on the second side of said slider portion in cooperative registration with said bomb spacing scale adjacent said third plurality of windows;

whereby the increase in altitude may be read above the number of bombs in the stick when the ballistic lead angle computed as in claim 1 is positioned over the bomb spacing desired.

5. A bomb ballistic slide rule as set forth in claim 4 and further including indicia for calculating stick intervalometer setting $\Delta t$, where $\Delta t$ is the time between successive bombs comprising:

a second transparent window on said second side of said body portion having indicia adjacent one edge thereof corresponding to true air speed; and an intervalometer setting scale disposed on said second side of said slider in cooperative registration with said second transparent window;

whereby an intervalometer setting may be read out over the true airspeed.

References Cited

UNITED STATES PATENTS

| | | | |
|---|---|---|---|
| 2,614,751 | 10/1952 | Heinz | 235—89 |
| 2,794,597 | 6/1957 | Maloof | 235—89 |
| 3,184,161 | 5/1965 | Schwarz et al. | 235—89 |
| 3,232,531 | 2/1966 | Hodge | 235—89 X |
| 3,289,931 | 12/1966 | Bennett et al. | 235—85 |

RICHARD B. WILKINSON, Primary Examiner

S. A. WAL, Assistant Examiner